United States Patent [19]
Didinsky et al.

[11] Patent Number: 6,145,790
[45] Date of Patent: Nov. 14, 2000

[54] ATTITUDE DETERMINATION SYSTEM AND METHOD

[75] Inventors: Garry Didinsky, Niles, Ill.; Yeong-Wei Andy Wu, Rancho Palos Verdes, Calif.

[73] Assignee: Hughes Electronics Corporation, El Segundo, Calif.

[21] Appl. No.: 09/158,675

[22] Filed: Sep. 22, 1998

[51] Int. Cl.[7] .................................................. B64G 1/24
[52] U.S. Cl. .............................................. 244/164; 244/171
[58] Field of Search ...................................... 244/171, 164, 244/165, 158 R

[56] References Cited

U.S. PATENT DOCUMENTS

| | | | |
|---|---|---|---|
| 5,108,050 | 4/1992 | Maute | 244/171 |
| 5,556,058 | 9/1996 | Bender | 244/171 |
| 5,558,305 | 9/1996 | Surauer et al. | 244/171 |
| 5,806,804 | 9/1998 | Goodzeit et al. | 244/171 |
| 5,996,941 | 12/1999 | Surauer et al. | 244/165 |

*Primary Examiner*—J. Woodrow Eldred
*Attorney, Agent, or Firm*—Terje Gudmestad; M. W. Sales

[57] ABSTRACT

An attitude sensing system utilizing simplified techniques and apparatus includes a spacecraft control processor which receives signals from an inertial measurement unit and two attitude sensors. The spacecraft control processor calculates a time-varying gain matrix for estimating attitude errors and gyroscope drifts corresponding to the axes of the inertial measurement unit. In special cases where the separation angle between the attitude sensor vectors is less than approximately 10 degrees, the time-varying gain matrix is computed as a fixed gain matrix and a corresponding desensitizing factor.

7 Claims, 3 Drawing Sheets

ATTITUDE DETERMINATION SYSTEM AND METHOD

TECHNICAL FIELD

The present invention relates to spacecraft attitude determination and, more particularly to a method of reducing attitude computational complexity while optimizing attitude determination performance.

BACKGROUND ART

It is often desirable to determine the attitude of a spacecraft for payload pointing purposes. Attitude refers to angular orientation of the spacecraft with respect to three orthogonal axes. Satellites typically employ attitude determination apparatus for pointing a payload such as a telescope or antenna to a desired location on the Earth. Conventional attitude sensing apparatus may include a satellite receiver such as a Global Positioning System (GPS), ground tracking apparatus for locating the satellite ephemerides, and star, sun or Earth sensors for transforming latitude, longitude and altitude information determined in spacecraft body coordinates into a stellar, or orbital frame of reference. Various methods have been used to process attitude sensor data to control spacecraft attitude.

Several methods of controlling spacecraft attitude using Extended Kalman Filter (EKF) based algorithms have been proposed to estimate the spacecraft attitude errors and gyroscope rate biases sing various attitude sensor data. For example, see E. J. Lefferts, et al., "Kalman Filtering for Spacecraft Attitude Determination," A.I.A.A. Journal on Guidance, Control and Dynamics, September.–October. 1982, pp. 417–429; A. Wu, "Attitude Determination for GEO Satellites," NASA Goddard 1997 Flight Mechanics Symposium, Greenbelt, Md., May 19–21, 1997.

The EKF is an established estimation method for attitude determination. In particular, the Kalman filter provides optimal noise attenuation performance for both process and measurement noises. EKF filtering is ideally suited for systems wherein disturbances are white noise processes. A steady state Kalman filter is a simple (fixed gain) estimator for state dynamics and measurement equations which are time-invariant. If either the state dynamics or measurement equations vary with time, however, the Kalman filter gains become time-varying. Existing EKF methods of attitude determination require the propagation of a 6×6 error covariance matrix between attitude observations in order to compute the time-varying Kalman filter gain matrix. Differential equations describing the error covariance propagation of a time-varying system necessarily includes matrix inversion operations. Such matrix propagation and updating requires intensive computations at each attitude processing cycle. These computations are beyond the capability of many current spacecraft control processors.

To reduce the computational complexity of such a system, a fixed gain filter approach can be used such as a TRIAD-based system. The TRIAD method of attitude determination is described in M.D. Shuster et al., "Three-Axis Attitude Determination From Vector Observations," Journal of Guidance and Control, vol. 4, no. 1, January–February 1981. A fixed gain approach to attitude determination reduces the computational complexity of the system, however, performance significantly deviates from the optimal solution provided by an EKF design because it ignores the time-varying measurement geometry in the filter design.

SUMMARY OF THE INVENTION

In the present invention, the aforementioned drawbacks of prior systems are solved by providing a set of fixed gains for the spacecraft attitude error signals and gyroscope rate bias gains, and adjusting these gains by a desensitizing matrix. The disclosed method reduces the computational complexity of an EKF design by eliminating the need to compute the error covariance matrix, yet maintains the near optimal performance of EKF designs by adjusting the estimator gains for the varying attitude sensor geometry. The present invention also improves upon the TRIAD based attitude determination methods by designating a set of fixed gains that are then adjusted by a desensitizing matrix.

The attitude determination system of the present invention employs a continuously running inertial rate sensor in conjunction with two attitude sensors such as sun and Earth sensors, sun and a beacon, two beacons, or two star measurement systems. Real-time knowledge of spacecraft inertial attitude is computed by numerically integrating gyroscope data which represents spacecraft body rates. Attitude sensor data is then processed to generate corrections to spacecraft attitude and gyroscope rate bias estimates.

Accordingly, an object of the present invention is to provide an improved spacecraft attitude determination method. Another object of the present invention is to provide attitude control for a satellite without the need to compute time-varying Kalman filter gains.

A further object of the present invention is to provide a rate bias estimator gain method that is optimized in poor geometry cases such as where two measurement vectors move close to each other.

An advantage of the present invention is that the design of the estimator gains is not limited to the Linear Quadratic Guassian (LQG) synthesis method.

Fixed gains can be designed using any synthesis tool, while desensitizing still improves these gains for varying measurement geometries.

Other objects and advantages of the invention will become apparent upon reading the following detailed description and appended claims, and upon reference to the accompanying drawings.

BRIEF DESCRIPTION OF THE DRAWINGS

For a more complete understanding of this invention reference should now be had to the embodiment illustrated in greater detail in the accompanying drawings and described below by way of example of the invention.

BEST MODE(S) FOR CARRYING OUT THE INVENTION

Figure 1:
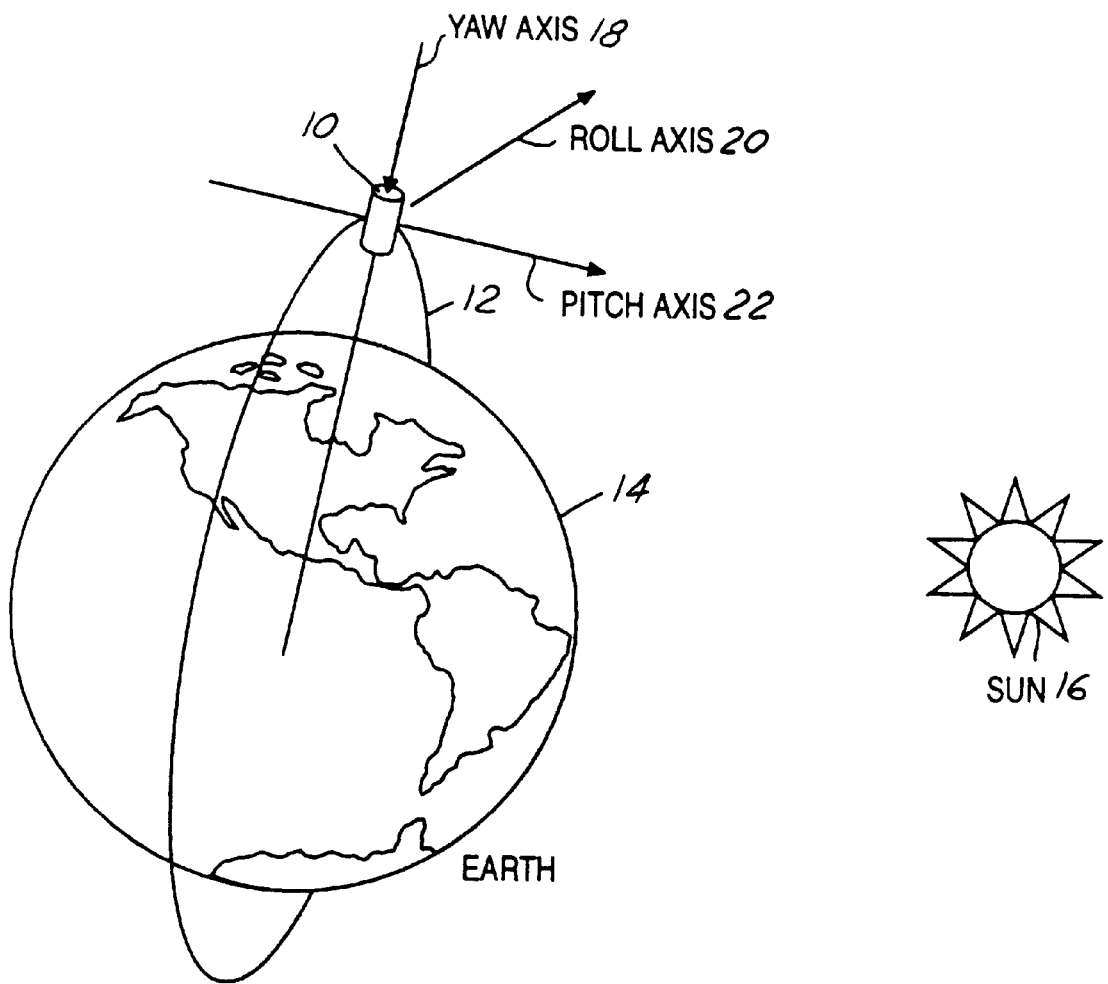
FIG. 1 is a diagrammatic representation of a satellite at an exemplary location relative to the Earth and Sun.

Referring to FIG. 1, a spacecraft (referred to hereafter as satellite 10) is shown in orbit 12 around the Earth 14. Three mutually orthogonal axes, labeled yaw axis 18, roll axis 20, and pitch axis 22, define a spacecraft frame of reference. The yaw axis 18 is coincident with the boresight of the satellite 10 pointing to the Earth center. The roll axis 20 is tangential to the orbit 12 in which the satellite 10 travels and the pitch axis 22 is orthogonal to the plane of the orbit 12. The illustrated orbit 12 is a Sun-synchronous orbit, as is characterized by the line of sight of the satellite 10 to the Sun 16 being coincident with the pitch axis 22. Alternatively, the satellite 10 may travel in a polar orbit.

The satellite 10 includes apparatus (see FIG. 2) for determining its attitude and for calibrating such attitude in order to continuously provide accurate attitude information. More particularly, attitude refers to the orientation of the satellite or spacecraft with respect to three orthogonal reference axes. The sensed attitude represents satellite angular orientation relative to the spacecraft frame of reference defined by the yaw axis 18, the roll axis 20, and the pitch axis 22. It is generally desirable to know the attitude of the satellite 10 with respect to the an orbital frame of reference by means of a direction cosine matrix which embodies the relation between the satellite body frame of reference and the orbital reference frame. A stellar (i.e., inertial) frame of reference is related to the orbital reference frame through ephemerides of the satellite and Earth. In the case where the satellite axes 18, 20, 22 are perfectly aligned with the orbital frame of reference, the pitch axis 22 of the satellite 10 experiences the full orbital rate.

Figure 2:
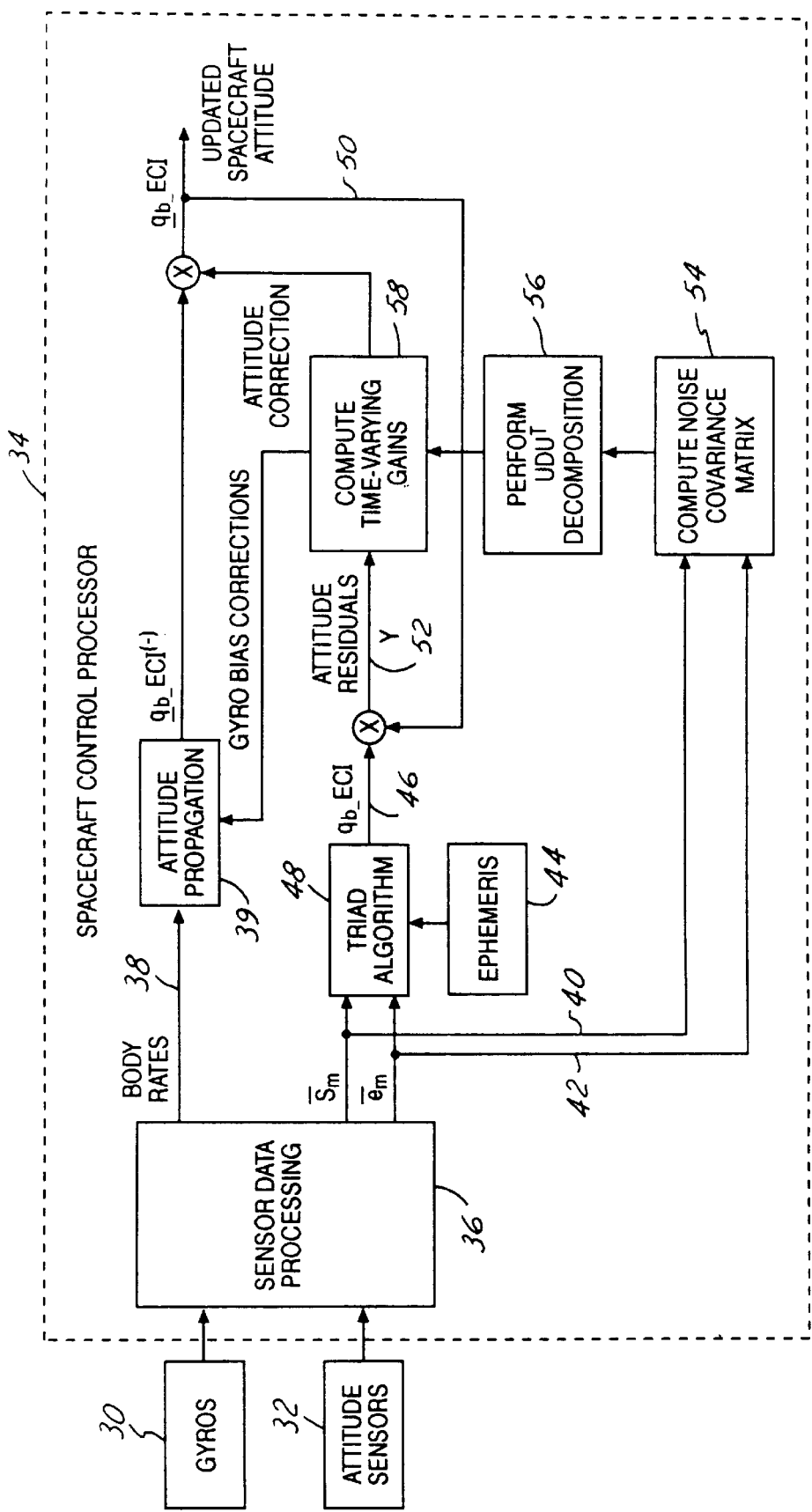
FIG. 2 is a functional block diagram of the attitude sensing apparatus according to the present invention.

FIG. 2 shows, in block diagram form, the major components of the satellite 10 necessary for attitude processing and control. The satellite 10 includes gyroscopes 30, attitude sensors 32 and a control processor 34.

Gyroscopes 30 located on the satellite 10 measure rotational rates experienced by the satellite 10 relative to the spacecraft frame of reference. The gyroscopes 30 measure the rotational rates of the satellite 10 with respect to the three mutually orthogonal axes 18, 20, 22 and provide a direction cosine matrix computed from sensed rates. Similarly, attitude sensors 32 such as sun sensors, Earth sensors, star trackers and/or beacons, provide a reference measurement to the respective sensed source.

While the gyroscopes 30 and attitude sensors 32 provide suitable means for updating the attitude of the satellite 10 between successive determinations, such measurement units are susceptible to drift over time, resulting in error in the sensed rotational rates and thus, in the resulting attitude information. In the present invention, the attitude information maintained or stored by the gyroscopes 30 and the attitude sensors 32 of the satellite 10 is periodically calibrated, or corrected in order to compensate for gyroscopic and sensor-introduced errors.

The spacecraft control processor 34 is responsible for processing the gyroscope and attitude sensor data to correct spacecraft attitude and gyroscope rate bias estimates and thereby maintain the satellite 10 in its desired attitude.

Incoming sensor data and gyroscope data is processed in block 36 by known methods to produce the spacecraft body rates 38 and, for example, a measurement of a sun vector $s_m$ 40 expressed in spacecraft body reference frame, and a measurement of an Earth vector $e_m$ 42 expressed in spacecraft body reference frame.

Body rates 38 are processed by known methods at block 39 to estimate the attitude propagation of the spacecraft 10 based on spacecraft kinematics.

Based on the sun and Earth vectors 40, 42 and sun/Earth ephemeris 44, the spacecraft attitude, $q_{b\_ECI}$, 46 expressed as a quaternion, can be computed using the TRIAD algorithm 48 (or QUEST algorithm). Using the measured spacecraft attitude 46 and the previously computed spacecraft attitude, $q_{b\_ECI}$, 50 the attitude residuals y 52 are given by the following equation:

$$Y = -2(\delta q(1) \delta q(2) \delta q(3))^T = (I_{3\times 3}\ O_{3\times 3})x + v$$

where $$\delta q = q_{b\_ECI} * (\underline{q}_{b\_ECI})^{-1} = (\delta q(1) \delta q(2) \delta q(3) \delta q(4))^T$$

and where $$x = (\delta\phi\ \delta\Theta\ \delta\psi\ \delta b_\phi\ \delta b_\Theta\ \delta b_\psi),$$

where $$(\underline{q}_{b\_ECI})^{-1} = (-\underline{q}(1) - \underline{q}(2) - \underline{q}(3) - \underline{q}(4))^T$$

with $$\underline{q}_{b\_ECI} = (\underline{q}(1)\underline{q}(2)\underline{q}(3)\underline{q}(4))^T,$$

where $\delta\phi\ \delta\Theta\ \delta\psi$ are spacecraft roll, pitch and yaw errors, and $\delta b_\phi$, $\delta b_\Theta$, $\delta b_\psi$, are roll, pitch and yaw gyroscope bias errors; and where v is the attitude measurement noise vector.

With knowledge of the attitude residuals, gyroscope rate bias corrections and spacecraft attitude corrections typically have been made using either a TRIAD-based fixed gain approach, or the EKF method. As noted above, a TRIAD-based system of computing gains does not consider the time-varying nature of the attitude sensor data, however, and the EKF method, although optimized for computing time varying gains, is computationally complex. The following procedure overcomes the drawbacks associated with computing gains using these prior methods by separating the gains computation into fixed gains and applying a desensitizing matrix thereto to compensate for the time-varying nature of the overall system. Thus, the time-varying feature of the EKF method is retained, while providing the computational throughput associated with the TRIAD-based fixed gain method.

To compute the time-varying gains for gyroscope rate bias and attitude corrections, the noise covariance matrix must first be computed. Given the sun and Earth vectors 40, 42, a noise covariance matrix R 54 can be computed as described in M. D. Shuster et al., "Three-Axis Attitude Determination From Vector Observations," Journal of Guidance and Control, Vol. 4, no. 1, January–February 1981:

$$R = \{E_{VV}^T\} = \sigma_e^2 I_{3\times 3} + \frac{1}{\sin^2(\phi)}((\sigma_s^2 - \sigma_e^2)e_m e_m^T + \sigma_e^2 \cos(\phi)(e_m e_m^T + s_m e_m^T))$$

where $\phi$ is the separation angle between the sun and Earth vectors 40, 42; $\sigma_e^2$ is the Earth sensor $1\sigma$ noise covariance, and $\sigma_s^2$ is the sun sensor $1\sigma$ noise covariance.

Once the noise covariance matrix 54 is known, a $UDU^T$ decomposition of the matrix R is performed at block 56 to obtain matrices U and D such that:

$$R = UDU^T$$

$$UU^{T=I}{}_{3\times 3}$$

From the decomposed noise covariance matrix R, the time-varying gain matrix $K_C$ can be computed at block 58 as follows:

$$K_C = \begin{pmatrix} u(q_1 I_{3\times 3} + 2q_2 D^{1/2})^{1/2} D^{-1/2} U^T \\ -q_2^{1/2} UD^{-1/2} U^T \end{pmatrix}$$

where

-continued $$Q = \begin{pmatrix} q_1 I_{3\times 3} & 0_{3\times 3} \\ 0_{3\times 3} & q_2 I_{3\times 3} \end{pmatrix}$$

where the process noise covariance matrix $Q=E\{nn^T\}$ and $n=[n_{arw1}\ n_{arw2}\ n_{arw3}\ n_{rrw1}\ n_{rrw2}\ n_{rrw3}]^T$ where $n_{arwi}$ are the arwi arw2 arw3 rrwl rrw2 rrw3 arwi gyro angle random walk noises and $n_{rrwi}$ are gyro rate random walk noises, with $E\{n^2_{arwi}\}=q_1$ and $E\{n^2_{rrwi}\}=q_2$.

For the typical case where $2q_2 D^{1/2} \ll q_1 I_{3\times 3}$, the time-varying gain matrix can be approximated as follows:

$K_C = KS$ with $$K = \begin{pmatrix} q_1^{1/2} I_{3\times 3} \\ -q_2^{1/2} I_{3\times 3} \end{pmatrix} = 6 \times 3 \text{ fixed gain matrix}$$

and $S = R^{-1/2} = 3 \times 3$ desensitizing matrix

Once the time-varying gains are computed, they can be used to update the spacecraft attitude by correcting attitude errors and gyroscope rate bias errors.

Figure 3:
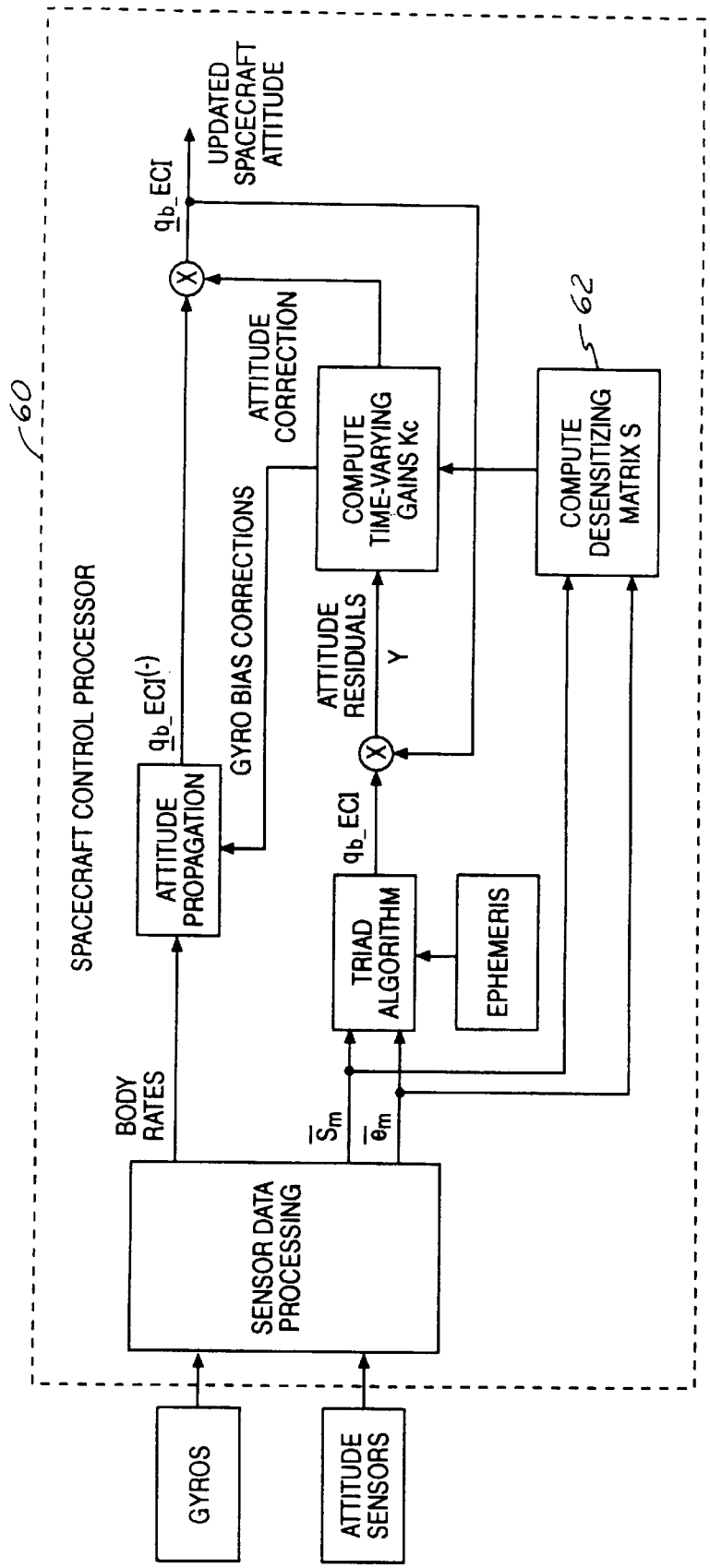
FIG. 3 is a functional block diagram of another embodiment of the attitude sensing apparatus according to the present invention.

FIG. 3 represents a simplified spacecraft control processor 60 for two special cases. In FIG. 3, all of the functional blocks are the same as in FIG. 2 except that steps of computing the noise covariance matrix 54 and performing the $UDU^T$ decomposition 56 steps can be combined into one step of computing the desensitizing matrix 62.

In the first case where a three-axis independent attitude measurement is available, U is approximately equal to an $I_{3\times 3}$ matrix. Accordingly $S=D^{-1/2}$.

In the second case where there is a small separation angle (greater than 2 degrees but less than 10 degrees) between the sun vector 40 and earth vector 42, equation (2) can be approximated as follows:

$$R \simeq \sigma_e^2 I_{3\times 3} + \frac{1}{\sin^2(\phi)}(\sigma_s^2 + \sigma_e^2)e_m e_m^T = U \begin{pmatrix} \sigma_e^2 + \frac{\sigma_s^2 + \sigma_e^2}{\sin^2(\phi)} & 0 & 0 \\ 0 & \sigma_e^2 & 0 \\ 0 & 0 & \sigma_e^2 \end{pmatrix} U^T$$

with $U=[e_m u_2 u_3]$; $u_2=[0\ 1\ 0]^T=$; $u_3=[0\ 0\ 1]^T$
and the desensitizing matrix S is given by:

$$S = \frac{1}{\sigma_e}(I_{3\times 3} - [1 - \mu\sin(\phi)]e_m e_m^T)$$

with $$\mu = \sqrt{\frac{\sigma_e^2}{\sigma_s^2 + \sigma_e^2}}$$

Thus, a desensitizing matrix and a time-varying gain matrix have been provided which allow for nearly optimal white noise attenuation in attitude determination and gyroscope rate bias calibrations, yet is computationally less complex than an EKF approach to computing attitude and gyroscope update gains.

While the invention was described in connection with one or more embodiments, it will be understood that the invention is not limited to those embodiments. On the contrary, the invention includes all alternatives, modifications, and equivalents as may be included within the spirit and scope of the appended claims.

What is claimed is:

1. A method of controlling the attitude of a spacecraft comprising the steps of:

generating a first attitude measurement vector $s_m$ from a first attitude sensor;

generating a second attitude measurement vector $e_m$ from a second attitude sensor;

computing a noise covariance matrix, R, wherein $$R = \sigma_e^2 I_{3\times 3} + \frac{1}{\sin^2(\varphi)}((\sigma_s^2 - \sigma_e^2)e_m e_m^T + \sigma_e^2 \cos(\Phi)(e_m e_m^T + s_m e_m^T))$$

where $\phi$ is the separation angle between said first and second attitude measurement vectors and $\sigma_e^2$ is the first attitude sensor 1 $\sigma$ noise covariance and $\sigma_s^2$ is the second attitude sensor I $\sigma$ noise covariance;

decomposing said noise covariance matrix, R, such that $R=UDU^T$ and $UU^T=I_{3\times 3}$;

defining a time-varying gain matrix Kc wherein $$Kc = \begin{pmatrix} u(q_1 I_{3\times 3} + 2q_2 D^{1/2})^{1/2} D^{-1/2} U^T \\ -q_2^{1/2} UD^{-1/2} U^T \end{pmatrix}$$

wherein $q_1$ represents gyro angle random walk noise and $q_2$ represents gyro rate random walk noise; and updating the attitude of said satellite in a manner directly related to the corresponding value of said Kc.

2. The method of claim 1 wherein said separation angle, $\phi$, between said first and second attitude measurement vectors $s_m$, $e_m$, is less than approximately 10 degrees, said time-varying gain matrix Kc being defined as:

$Kc=KS$ wherein $$K = \begin{pmatrix} q_1^{1/2} I_{3\times 3} \\ -q_2^{1/2} I_{3\times 3} \end{pmatrix}$$

and $$S = \frac{1}{\sigma_e}(I_{3\times 3} - [1 - \mu\sin(\phi)]e_m e_m^T)$$

where $$\mu = \sqrt{\frac{\sigma_e^2}{\sigma_s^2 + \sigma_e^2}}.$$

3. The method of claim 1 wherein said first attitude sensor is a sun sensor and said second attitude sensor is an earth sensor.

4. An attitude sensing system for a spacecraft comprising:
first and second attitude sensors each of said respective attitude sensors providing an output vector $e_m$, $s_m$, to a detected source;

an inertial measurement unit for providing a direction cosine matrix representing the attitude of said spacecraft in inertial space with respect to a yaw axis, a pitch axis, and a roll axis defining a frame of reference of said system; and, a spacecraft control processor, responsive to said output vectors and said direction cosine matrix, for providing a time-varying gain matrix for correcting the attitude of said spacecraft wherein said time-varying gain matrix Kc is defined as $$Kc = \begin{pmatrix} u(q_1 I_{3\times 3} + 2q_2 D^{1/2})^{1/2} D^{-1/2} U^T \\ -q_2^{1/2} U D^{-1/2} U^T \end{pmatrix}$$

wherein $q_1$ represents gyro angle random walk noise and $q_2$ represents gyro rate random walk noise.

5. The attitude sensing system of claim 4 wherein said attitude sensors include an earth sensor and a sun sensor.

6. The attitude sensing system of claim 4 wherein said inertial measurement unit comprises three gyroscopes oriented along three mutually orthogonal axes.

7. The attitude sensing system of claim 4 wherein the separation angle between said output vectors $e_m$, $s_m$, is less than approximately 10 degrees said time-varying gain matrix Kc is defined as:

$$Kc = KS$$

wherein $$K = \begin{pmatrix} q_1^{1/2} & I_{3\times 3} \\ -q_2^{1/2} & I_{3\times 3} \end{pmatrix}$$

and $$S = \frac{1}{\sigma_e}(I_{3\times 3} - [1 - \mu\sin(\phi)]e_m e_m^T)$$

where $$\mu = \sqrt{\frac{\sigma_e^2}{\sigma_s^2 + \sigma_e^2}}$$

and wherein $\phi$ is the separation angle between said output vectors $e_m$, $s_m$, and $\sigma_e^2$ is the first attitude sensor 1 $\sigma$ noise covariance and $\sigma_s^2$ is the second attitude sensor 1 $\sigma$ noise covariance.

* * * * *